US011250166B2

(12) United States Patent
Sullivan et al.

(10) Patent No.: US 11,250,166 B2
(45) Date of Patent: *Feb. 15, 2022

(54) FINGERPRINT-BASED CONFIGURATION TYPING AND CLASSIFICATION

(71) Applicant: ServiceNow, Inc., Santa Clara, CA (US)

(72) Inventors: Josiah Sullivan, Sammamish, WA (US); Kelly Vincent, Renton, WA (US)

(73) Assignee: ServiceNow, Inc., Santa Clara, CA (US)

(*) Notice: Subject to any disclaimer, the term of this patent is extended or adjusted under 35 U.S.C. 154(b) by 53 days.

This patent is subject to a terminal disclaimer.

(21) Appl. No.: 16/189,890

(22) Filed: Nov. 13, 2018

(65) Prior Publication Data
US 2019/0180057 A1 Jun. 13, 2019

Related U.S. Application Data

(63) Continuation of application No. 14/336,279, filed on Jul. 21, 2014, now Pat. No. 10,210,351.

(51) Int. Cl.
G06F 21/73 (2013.01)
G06F 21/44 (2013.01)
G06Q 10/06 (2012.01)
G06Q 10/08 (2012.01)

(52) U.S. Cl.
CPC .............. *G06F 21/73* (2013.01); *G06F 21/44* (2013.01); *G06Q 10/06* (2013.01); *G06Q 10/087* (2013.01)

(58) Field of Classification Search
CPC ......... G06F 21/73; G06F 21/44; G06Q 10/06; G06Q 10/087

USPC ......................................................... 707/770
See application file for complete search history.

(56) References Cited

U.S. PATENT DOCUMENTS

| 5,619,724 | A  | 4/1997  | Moore           |
|-----------|----|---------|-----------------|
| 5,978,594 | A  | 11/1999 | Bonnell         |
| 6,005,942 | A  | 12/1999 | Chan et al.     |
| 6,321,229 | B1 | 11/2001 | Goldman         |
| 6,457,053 | B1 | 9/2002  | Satagopan et al.|
| 6,799,189 | B2 | 9/2004  | Huxoll          |

(Continued)

FOREIGN PATENT DOCUMENTS

EP      2112782 A1     10/2009

*Primary Examiner* — Hicham Skhoun
(74) *Attorney, Agent, or Firm* — Fletcher Yoder PC

(57) ABSTRACT

Disclosed are techniques for automating records related to devices coupled to a network, such as servers, clients and memory banks. The fingerprint-based configuration typing and classification described herein may identify a fingerprint for a first device located on a network, the first device having a plurality of hardware components and the fingerprint generated based on a combination of at least two hardware components of the first device. The fingerprint is assigned to the first device. If the device does not have a first identifier assigned to it that identifies the plurality of hardware components, the fingerprint is compared to a plurality of stored fingerprints, with at least some of the stored fingerprints having a respective identifier. If the fingerprint matches one of the plurality of stored fingerprints and that stored fingerprint has an identifier associated therewith, the identifier associated with the stored fingerprint is assigned to the first device as the first identifier.

20 Claims, 4 Drawing Sheets

(56) References Cited

U.S. PATENT DOCUMENTS

| | | | |
|---|---|---|---|
| 6,816,898 B1 | 11/2004 | Scarpelli | |
| 6,895,586 B1 | 5/2005 | Brasher | |
| 7,027,411 B1 | 4/2006 | Pulsipher | |
| 7,310,629 B1 * | 12/2007 | Mendelson | H04L 63/08 |
| 7,392,300 B2 | 6/2008 | Anantharangachar | |
| 7,617,073 B2 | 11/2009 | Trinon | |
| 7,685,167 B2 | 3/2010 | Mueller | |
| 7,877,783 B1 | 1/2011 | Cline | |
| 7,921,218 B2 | 4/2011 | Cheng et al. | |
| 7,933,927 B2 | 4/2011 | Dee | |
| 7,941,506 B2 | 5/2011 | Bonal | |
| 7,945,860 B2 | 5/2011 | Vambenepe | |
| 8,082,222 B2 | 12/2011 | Rangarajan | |
| 8,301,589 B2 | 10/2012 | Sen et al. | |
| 8,346,752 B2 | 1/2013 | Sirota | |
| 8,365,201 B2 | 1/2013 | Holan et al. | |
| 8,380,645 B2 | 2/2013 | Kowalski | |
| 8,554,750 B2 | 10/2013 | Rangaranjan | |
| 8,646,093 B2 | 2/2014 | Myers | |
| 8,683,032 B2 | 3/2014 | Spinelli | |
| 8,745,040 B2 | 6/2014 | Kowalski | |
| 8,812,539 B2 | 8/2014 | Milousheff | |
| 8,828,994 B2 | 8/2014 | Kowalski | |
| 8,907,988 B2 | 12/2014 | Poston | |
| 9,015,188 B2 | 4/2015 | Behne | |
| 9,037,536 B2 | 5/2015 | Vos | |
| 9,137,115 B2 | 9/2015 | Mayfield | |
| 9,261,372 B2 | 2/2016 | Cline et al. | |
| 9,323,801 B2 | 4/2016 | Morozov | |
| 9,412,084 B2 | 9/2016 | Kowalski | |
| 9,467,344 B2 | 10/2016 | Gere | |
| 9,534,903 B2 | 1/2017 | Cline | |
| 9,613,070 B2 | 4/2017 | Kumar | |
| 9,631,934 B2 | 4/2017 | Cline | |
| 9,659,051 B2 | 5/2017 | Hutchins | |
| 9,792,387 B2 | 10/2017 | George | |
| 9,852,165 B2 | 12/2017 | Morozov | |
| 9,967,162 B2 | 5/2018 | Spinelli | |
| 10,002,203 B2 | 6/2018 | George | |
| 2006/0274753 A1 | 12/2006 | Park et al. | |
| 2007/0192872 A1 | 8/2007 | Rhoads et al. | |
| 2008/0043000 A1 | 2/2008 | Currid et al. | |
| 2011/0093703 A1 * | 4/2011 | Etchegoyen | G06F 21/57 713/168 |
| 2012/0011704 A1 | 1/2012 | Hammouri et al. | |
| 2012/0117419 A1 | 5/2012 | Hillman et al. | |
| 2013/0346260 A1 * | 12/2013 | Jubran | G06F 9/5072 705/28 |
| 2014/0325555 A1 | 10/2014 | Khader et al. | |

* cited by examiner

FINGERPRINT-BASED CONFIGURATION TYPING AND CLASSIFICATION

CROSS REFERENCE TO RELATED APPLICATION

The present disclosure is a continuation of and claims priority to U.S. patent application Ser. No. 14/336,279, entitled, "FINGERPRINT-BASED CONFIGURATION TYPING AND CLASSIFICATION," filed on Jul. 21, 2014, which is herein incorporated by reference in its entirety for all purposes.

TECHNICAL FIELD

This disclosure relates to configuration typing and classification of physical, e.g., hardware, devices using fingerprints.

BACKGROUND

Information technology (IT) organizations and service providers, such as providers of cloud-based services, face increasingly large numbers of hardware devices as storage prices decrease and Big Data becomes common. These hardware devices and their subcomponents can number in the thousands. While it is relatively simple to discover and store information related to a single device, it is difficult to know what other devices have similar or identical configurations. Increased scale and a high rate of change experienced by an environment results in frequent part removal or replacement. Together, these elements render manual classification ineffective.

SUMMARY

Disclosed herein are techniques for automatically assigning and managing fingerprints to devices connected by one or more networks. One method taught includes identifying a fingerprint for a first device located on a network, the first device having a plurality of hardware components and the fingerprint generated based on a combination of at least two hardware components of the first device, and assigning the fingerprint to the first device. The method, upon a condition that the device does not have a first identifier assigned to it that identifies the plurality of hardware components, compares the fingerprint to a plurality of stored fingerprints, with at least some of the stored fingerprints having a respective identifier. Upon a condition that the fingerprint matches one of the plurality of stored fingerprints and the one of the plurality of stored fingerprints has an identifier associated therewith, the identifier associated with the one of the plurality of stored fingerprints is assigned to the first device as the first identifier.

An apparatus taught herein includes a memory and a processor. The processor is configured to execute instructions stored in the memory to identify a fingerprint for a first device located on a network, the first device having a plurality of hardware components and the fingerprint generated based on a combination of at least two hardware components of the first device, assign the fingerprint to the first device, upon a condition that the device does not have a first identifier assigned to it that identifies the plurality of hardware components, compare the fingerprint to a plurality of stored fingerprints, with at least some of the stored fingerprints having a respective identifier, and, upon a condition that the fingerprint matches one of the plurality of stored fingerprints and the one of the plurality of stored fingerprints has an identifier associated therewith, assign the identifier with the one of the plurality of stored fingerprints to the first device as the first identifier.

Variations in these and other implementations of the teachings herein will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Organizations desirably classify technical equipment or devices, commonly servers, into particular groups based on the specific combination of physical components forming the device. This is frequently referred to as a stock keeping unit (SKU) or bill of materials (BOM). As soon as a device is classified as one configuration, parts can be removed or inserted, thereby rendering the previous classification incorrect. Keeping track of new and updated devices requires a great deal of inefficient human interaction to remain marginally accurate. In any event, it is almost impossible to reach total accuracy.

One way to address this issue is to build complex business rules in an attempt to sort the devices into buckets based on their components (i.e., their configuration of components). However, the decision tree must be modified each time a new component is added to the environment as a whole. It also must be re-tested to ensure logic integrity has not been compromised once modified. This complexity can lead to inaccuracy and delay and requires a high degree of expert-level human interaction to maintain and troubleshoot the rule set.

In contrast, the teachings herein describe the automated assignment of fingerprints to a device based on the combination of physical components forming the device. In this way, each device on a network has a fingerprint. A database of the devices is updated when an existing device is changed or a new device is added. Each device may also have a SKU field and one or more metadata tags helpful in typing and classifying the devices. This eliminates complex business logic and decision trees through the use of automated, dynamic, tagged fingerprints to group devices. Reporting is also streamlined through generation of reports on fingerprints or fingerprint tags and metadata. Details of the certain implementations of the invention follow an initial discussion of the environment in which they may be implemented.

Figure 1:
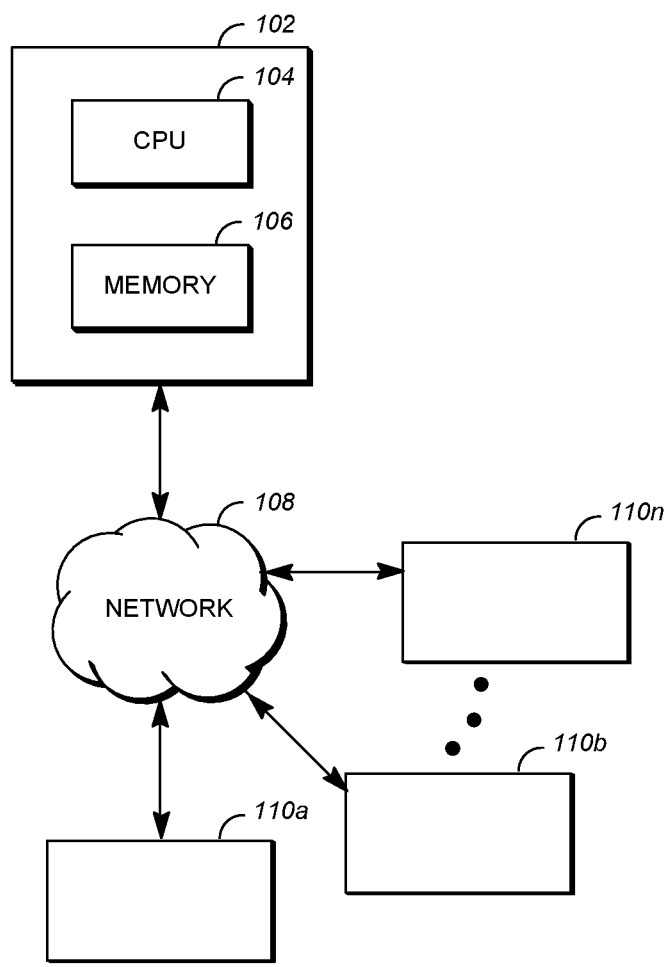
FIG. 1 is a schematic of a computing system in which teachings according to the present invention may be implemented.

FIG. 1 is a schematic of a computing system 100 in which teachings according to the present invention may be implemented. Computing system 100 includes a server station 102. Server station 102 may be, for example, a computer having an internal configuration of hardware such as a central processing unit (CPU) 104 and at least one memory 106. Additional details of one implementation of server station 102 follow with reference to FIG. 2. However, various implementations are possible. Moreover, the functions of server station 102 described hereinafter may be distributed among multiple devices.

A network 108 connects server station 102 with a number of network-enabled devices 110a, 110b, . . . 110n (collectively referred to as devices 110). Network-enabled means that devices 110 are configured to communicate over network 108 as discussed hereinafter. Network 108 can be, for example, the Internet. Network 108 can also be a local area network (LAN), wide area network (WAN), virtual private network (VPN), cellular telephone network or any other means of transferring data between server station 102 and devices 110. Network 108 can be formed of more than one tiered network, and one or more intermediate devices may exist between server station 102 and devices 110.

Devices 110 have a variety of configurations and hence a variety of hardware components. Some of the possible configurations are described with reference to FIG. 2.

Figure 2:
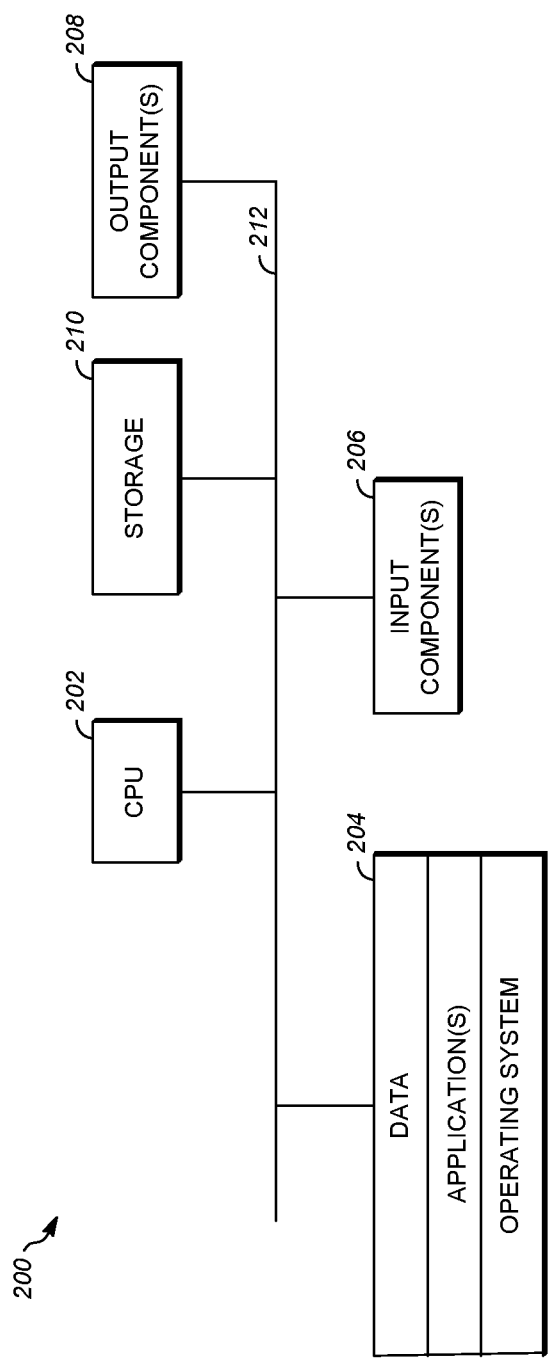
FIG. 2 is a block diagram of a computing device that may be fingerprinted according to the teachings herein.

FIG. 2 is a block diagram of a computing device 200 that may be fingerprinted according to the teachings herein. Computing device 200 may implement one or any of server station 102 and devices 110 of FIG. 1. In FIG. 2, computing device 200 includes a CPU 202 as a conventional central processing unit. Alternatively, CPU 202 can be any other type of component, or multiple components, capable of manipulating or processing information as discussed herein.

A memory component 204 in computing device 200 can be a read only memory (ROM) device or a random access memory (RAM) device in an implementation. Any other suitable type of storage device can be used as memory component 204. Memory component 204 can include an operating system, one or more applications in the form of program code, and data. When computing device 200 implements server station 102, for example, one of the applications may implement the fingerprint-based configuration typing and classification described herein.

Computing device 200 may also include one or more input component(s) 206 and output component(s) 208. Input component 206 may be a camera, keyboard, microphone, etc. Output component 208 may be a display, speaker, etc. Input and output components 206, 208 may also be combined into a single component, for example a touch sensitive display that combines a display with a touch sensitive element that is operable to sense touch inputs.

As shown in FIG. 2, computing device 200 includes a supplemental or secondary storage component 210. Storage component 210 may be a memory card in a format such as a PC card, a CompactFlash, Multimedia Card, etc., or in any other form. A significant amount of data may be required in certain processes performed by computing device 200. Such data may be stored in whole or in part in storage component 210 and loaded into memory component 204 as needed for processing.

The components of computing device 200, namely CPU 202, memory component 204, input component(s) 206, output component(s) 208 and storage component 210, are coupled for communication over a bus component 212. Bus component 212 may be any type of bus that allows communication between the components. In addition, bus component 212 may be coupled to one or more wired or wireless communication components allowing communications external of computing device 200. For example, when computing device 200 is used to implement server station 102, bus component 212 may be used to communicate with devices 110. When computing device 200 is used to implement one or more of devices 110a, 110b, . . . 110n, bus component 212 may be used to communicate with server station 102. Bus component 212 may be composed of multiple bus components.

Although FIG. 2 depicts one particular configuration, computing device 200 may be implemented with a variety of components and form a variety of computing devices. For example, device 110 could be a printer, memory bank, server, client, etc., formed of a number of hardware components. When device 110 is a printer, storage component 210 and output component(s) 208 may be excluded and a printer card may be included as input component 206. When device 110 is a memory bank, memory component 204 may be excluded, and several storage components 210 may be included. Further, and depending on device 110, CPU 202 may instead be one or more other intelligent hardware components, such as an application-specific integrated circuit (ASIC), a Field-Programmable Gate Array (FPGA), etc. Other hardware components not shown may also be used within a device classified according to the teachings herein.

Figure 3:
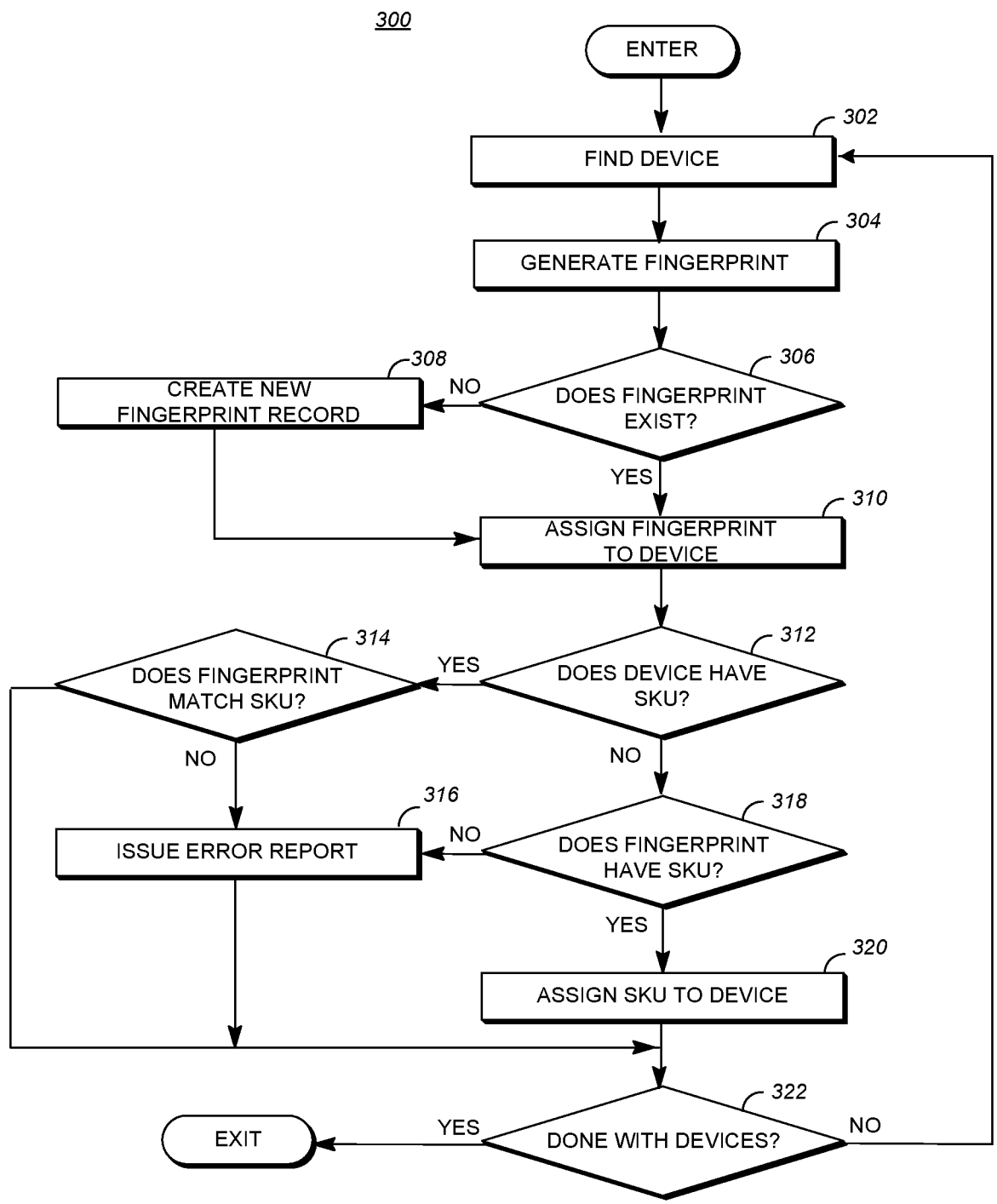
FIG. 3 is a block diagram of a process of fingerprint-based configuration typing and classification according to one implementation of the teachings herein.

FIG. 3 is a block diagram of a process 300 of fingerprint-based configuration typing and classification according to one implementation of the teachings herein. Process 300 is implemented by a computing device, such as server station 102. Process 300 may be implemented as a software program formed of machine-readable instructions that are stored in a memory such that, when executed by a processor, cause the computing device to perform process 300. Process 300 can also be implemented using hardware in whole or in part. As explained above, some computing devices may have multiple memories and multiple processors, and the steps of process 300 may in such cases be distributed using different processors and memories. Use of the terms "processor" and "memory" in the singular herein encompasses computing devices that have only one processor or one memory as well as devices having multiple processors or memories that may each be used in the performance of some but not necessarily all recited steps.

For simplicity of explanation, process 300 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

Broadly, process 300 assigns a fingerprint to each combination of physical components forming a network-connected device. Fingerprints are described below in additional detail with reference to FIG. 4. Each device desirably has an identifier where the fingerprint is effectively the "actual" configuration at a point in time, and the identifier may be considered to be the "desired" configuration as described below. The identifier desirably comprises a list of components in the form of, for example, a SKU (or BOM) field and is referred to below as the SKU in this example. Ideally, the fingerprint should match the SKU field every time the fingerprint is generated. If a device has no SKU when the fingerprint is first generated, the fingerprint can be used to assign a SKU if there is a match. If a device has a SKU that does not match the fingerprint, the device is flagged as a mismatch for future investigation and troubleshooting. If a device has a fingerprint that is not tagged with a valid or active SKU, no SKU association is made. Such devices can also be reported on and investigated.

More specifically, process 300 finds a device, for example one of devices 110a, 110b, . . . 110n, at step 302. Finding the device 110 may be responsive to a query, such as a periodic query. The query may also be prompted by the addition of a new device 110 to computing system 100. Responsive to the query, device 110 returns data that can be used to generate a fingerprint as described below. The data may be produced by a processor of device 110 through a query the processor makes to components along a bus of device 110, such as bus component 212. Alternatively, a processor of server device 102 may directly query the identity of components of network-enabled device 110. The query from server device 102 and response from device 110 may be transmitted over network 108, for example.

At step 304, process 300 generates the fingerprint for device 110 using the data responsive to the query. Again, fingerprints are described in additional detail with reference to FIG. 4. At step 306, process 300 queries a data store of fingerprints to determine whether the fingerprint already exists. The data store may be, for example, one or more databases, spreadsheets, etc., stored in memory of server device 102, such as in memory component 204 or storage component 210. If the fingerprint does not exist, process 300 advances to step 308 to create a new fingerprint record in the data store and then assigns the fingerprint to the current device 110 at step 310. If the fingerprint does exist in response to the query of step 306, process 300 advances directly to step 310 to assign the fingerprint to the current device 110. Assigning the fingerprint to the current device 110 may involve storing the fingerprint in association with the current device 110, such as in a database of the data store or elsewhere. The current device 110 may be represented by a location, serial number or other ID number tied to the current device 110, such as in non-volatile memory, which is neither the identifier nor the fingerprint.

After assignment at step 310, process 300 queries as to whether the current device 110 has an identifier, a SKU in this example, at step 312. The identifier may be part of the data received from the current device 110 in response to the initial query.

If the current device 110 has a SKU in response to the query of step 312, process 300 advances to step 314 to query whether the fingerprint matches the SKU. The comparison may be made character-by-character such that a match represents that the fingerprint and SKU are the same. Alternatively, the data store may maintain a correspondence between fingerprints and SKUs. In this case, a match represents that the SKU corresponds to the fingerprint in the data store. If no match exists in response to the query of step 314, process 300 issues an error report at step 316. The error report describes the current device 110 and its mismatched SKU and fingerprint. This mismatch could represent, for example, a change in the actual configuration of the current device 110 (represented by the fingerprint) as compared to the previously-designated configuration (represented by the SKU).

Referring back to step 312, process 300 advances to step 318 if the current device 110 does not have a SKU. At step 318, process 300 queries as to whether the fingerprint has a SKU corresponding to it in, for example, the data store. If not, process 300 advances to step 316 to issue an error report. The error report identifies the fingerprint as a fingerprint without a SKU. This could mean that the current device 110 has a new configuration not previously included in the data store. In contrast, if the fingerprint has a SKU at step 318, process 300 advances to step 320 to assign the SKU from the data store to the current device 110. The SKU may be sent over network 108 for storage in memory component 204 of the current device 110, for example. The SKU may additionally or alternatively be stored, such as in a database of the data store or elsewhere, in association with a location, serial number, etc., tied to the current device 110 that is neither the identifier nor the fingerprint.

After the error report issues at step 316, or the SKU is assigned at step 320, process 300 checks to see whether there are other devices 110 connected in the computing system, such as computing system 100, at step 322. If so, process 300 returns to step 302 to find the next device 110 for typing and classification. Otherwise, process 300 ends. Desirably, process 300 is performed for each device 110a, 110b, . . . 110n connected to the computer system 100 each time process 300 is performed. In certain implementations, process 300 is performed when a device is added solely to add the device and is otherwise performed periodically.

Figure 4:
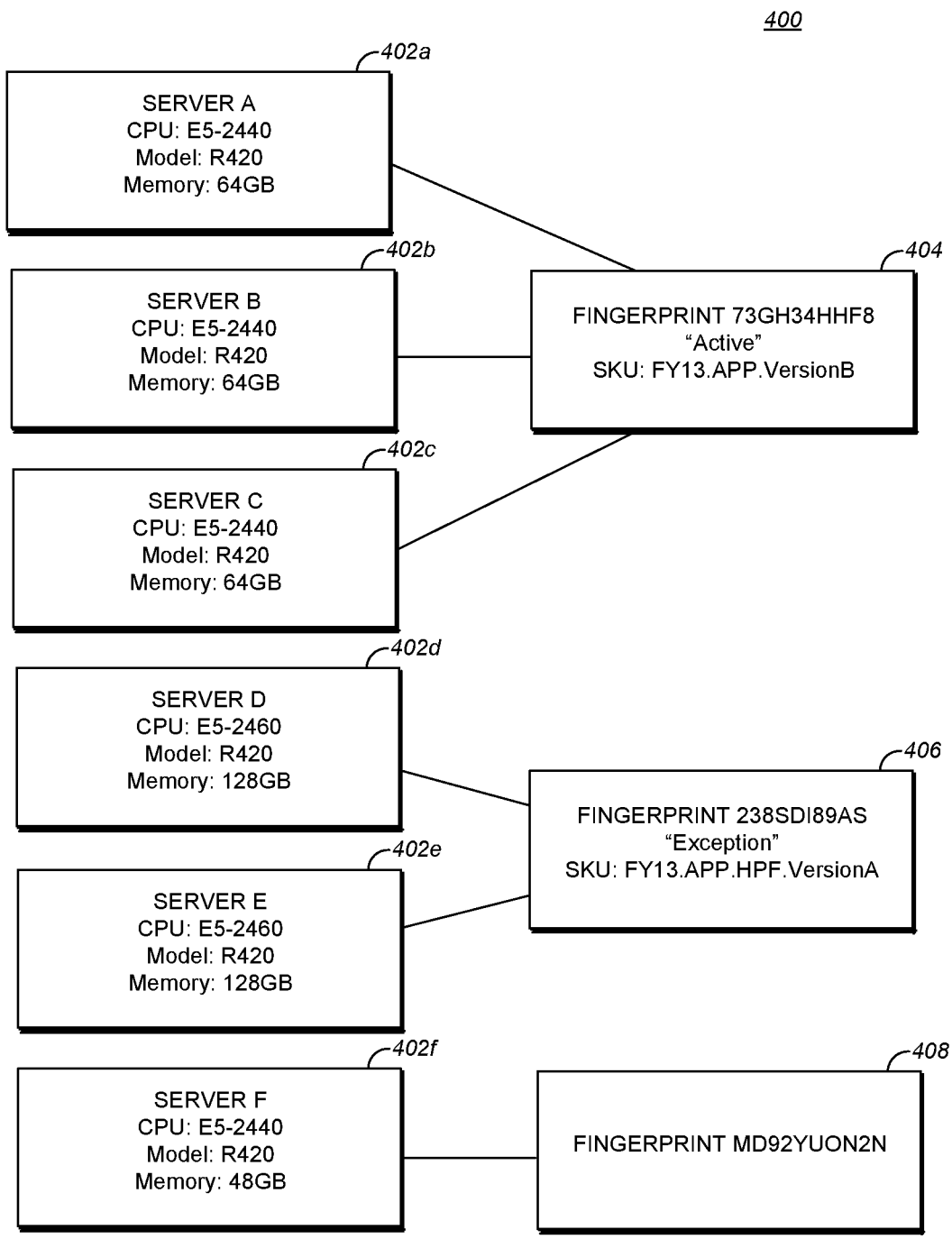
FIG. 4 is a schematic of a server system with fingerprints assigned according to the teachings herein.

FIG. 4 is a schematic of a server system 400 with fingerprints assigned according to the teachings herein. Server system 400 includes six servers 402a to 402f Server A 402a, server B 402b and server C 402c are assigned a first fingerprint 404, server D 402d and server E 402e are assigned a second fingerprint 406, and server F 402f is assigned a third fingerprint 408.

The fingerprints 404, 406, 408 are dynamically generated at step 304 to create a unique fingerprint based on each unique combination of physical components. A fingerprint is created the first time a specific combination of components is detected, and is expunged when that combination no longer exists. For example, after process 300 is completed for each device 110, any fingerprint not associated with a device 110 may be removed from the data store.

A fingerprint may be generated by a number of techniques, and the particular technique used is not important as long as the same configuration for more than one device results in the same fingerprint. One technique may include using a hash function with the data for the specific hardware components as input. Another technique may involve discarding data associated with one or more of the components and applying a hash or other function or transformation to the remaining data. Yet another technique is to insert the components into a database entry and use the entry index as the fingerprint.

The fingerprint is tunable in that it can be based on various device components such as Model number, CPU, memory, chassis, linecard, etc. It can also be based on ranges. For example, a memory range can be set for plus or minus 4 GB, so that otherwise identical devices with 7 GB, 9 GB and 9.5 GB would be grouped into one 8 GB set (i.e., under one fingerprint) and machines with 15 GB, 16 GB, and 17 GB would be grouped into one 16 GB set (i.e., under another fingerprint). This tunable behavior allows the user to define how loose or granular to be when creating fingerprints. Once granularity is set, human interaction is not needed in the creation of the fingerprints. Process 300 can run frequently on a configurable basis to ensure data is timely and accurate.

Implementations of the present invention also provide for metadata tagging of the fingerprints. Metadata tagging provides labels with information that may be useful to the user of the data store. Various tags are possible and may be stored with a server, device or both, in association with a fingerprint. For example, many computing systems 100 will have a long tail distribution of fingerprints, where a large number of devices fall into a small number of fingerprints but relatively unique configurations result in a large number of fingerprints with very few matching devices. For example, the most common fingerprint with a current configuration can be tagged with the metadata tag of "Approved", "Current" or "Active" as with fingerprint 404 of FIG. 4. As another example, a configuration that is no longer desirably used can be tagged with the metadata tag of "Obsolete" or "Exception" as with fingerprint 406 of FIG. 4. In this or another implementation, the identifiers such as SKUs may also be assigned with a name that is easily recognizable or that refers to a documented configuration standard, for example.

Note that tag association may be non-exclusive, allowing the same tag to be shared across multiple fingerprints. This allows multiple fingerprints to be coalesced into larger groups for management or reporting. Tags may be assigned after process 300 is complete. In an alternative implementation, the metadata tag(s) may be associated with the identifier, such as the SKU.

According to the teachings herein, problems with keeping track of devices connected in a distributed computing system are addressed by automating the generation of fingerprints in a way that permits tracking of new and changed devices. Each device can be tagged with metadata for easier tracking. The automated fingerprint-based grouping, reporting and rapid classification of large groups of similar physical components described herein eliminates complex business logic and decision trees by using automated, dynamic, tagged fingerprints to group devices. Administration of this model simply becomes tagging the most common fingerprints (e.g., associating the fingerprint to an identifier) and investigating a small number of outlier fingerprints as they are identified. Reporting is similarly streamlined as reports can immediately be generated on fingerprint or fingerprint tags and metadata.

Implementations of server station 102 and/or devices 110 (and the algorithms, methods, instructions, etc., stored thereon and/or executed thereby) can be realized in hardware, software, or any combination thereof. The hardware can include, for example, computers, intellectual property (IP) cores, ASICs, programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

All or a portion of implementations of the present invention can take the form of a computer program product accessible from, for example, a tangible, non-transitory computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for automatically tracking a configuration of a device located on a network, comprising:
   generating, as a function of a hardware component of the device, a fingerprint of the device, wherein the function comprises a granularity such that a different hardware component of the same type or capacity according to the granularity is an equivalent input to the function and has an identical fingerprint output by the function;
   determining that the fingerprint does not match a previously generated fingerprint for the device in a data store;
   storing, in the data store, the fingerprint in association with an identifier of the device responsive to determining that the fingerprint does not match the previously generated fingerprint; and
   generating a report configured to indicate that the configuration of the device has been updated responsive to determining that the device is associated with an expected device configuration of the device and that the fingerprint of the device does not correspond to the expected device configuration of the device, wherein the expected device configuration comprises a stock keeping unit (SKU) or a bill of materials (BOM).

2. The method of claim 1, wherein the identifier of the device comprises a location or a serial number associated with the device.

3. The method of claim 1, wherein the hardware component of the device comprises a first memory having a first memory size, wherein the different hardware component comprises a second memory having a second memory size different from the first memory size, and wherein, the granularity comprises a range of memory sizes such that the first memory size and the second memory size are equivalent inputs to the function.

4. The method of claim 1, wherein determining that the fingerprint does not correspond to the expected device configuration comprises determining that the fingerprint is not stored, in the data store, in association with the expected device configuration.

5. The method of claim 1, wherein determining that the fingerprint does not correspond to the expected device configuration comprises determining that the fingerprint differs from the expected device configuration.

6. The method of claim 1, comprising, responsive to determining that the device is not associated with the expected device configuration and that the fingerprint corresponds to the expected device configuration:
   storing, in the data store, the expected device configuration in association with the identifier of the device.

7. The method of claim 1, comprising, responsive to determining that the device is not associated with the expected device configuration and that the fingerprint does not correspond to the expected device configuration:
   generating an additional report configured to indicate that the configuration of the device is a new configuration in the network.

8. The method of claim 1, wherein the function is configured to:
   insert information corresponding to the hardware component into a database entry; and
   generate the fingerprint based at least in part on an index of the database entry.

9. The method of claim 1, wherein the function comprises a hash function.

10. A tangible, non-transitory, machine-readable medium, comprising machine-readable instructions that, when executed by one or more processors, cause the one or more processors to perform operations comprising:
    identifying a device located on a network;
    generating a hardware configuration classifier for the device, wherein the hardware configuration classifier is generated as a function of a hardware component of the device;

determining that the hardware configuration classifier does not match a previously generated hardware configuration classifier for the device in a data store;

storing, in the data store, the hardware configuration classifier in association with a device identifier of the device responsive to determining that the hardware configuration classifier does not match the previously generated hardware configuration classifier; and generating a report configured to indicate that a configuration of the device is a new configuration in the network responsive to determining that the device is not associated with an expected device configuration and that the hardware configuration classifier does not correspond to the expected device configuration, wherein the expected device configuration comprises an additional device identifier that is representative of a static configuration of the device.

11. The tangible, non-transitory, machine-readable medium of claim 10, wherein determining that the device is not associated with the expected device configuration comprises determining that the device identifier is not stored, in the data store, in association with the expected device configuration.

12. The tangible, non-transitory, machine-readable medium of claim 10, wherein determining that the device is not associated with the expected device configuration comprises:

transmitting a query to the device for the expected device configuration;

receiving, from the device, a response to the query; and determining that the device is not associated with the expected device configuration based at least in part on the response.

13. The tangible, non-transitory, machine-readable medium of claim 10, wherein determining that the hardware configuration classifier does not correspond to the expected device configuration comprises determining that the hardware configuration classifier is not stored, in the data store, in association with the expected device configuration.

14. The tangible, non-transitory, machine-readable medium of claim 10, wherein the operations comprise:

identifying an additional hardware configuration classifier in the data store, wherein the additional hardware configuration classifier is not associated with any device located on the network; and deleting the additional hardware configuration classifier from the data store.

15. The tangible, non-transitory, machine-readable medium of claim 10, wherein the machine-readable instructions, when executed by the one or more processors, cause the one or more processors to perform the operations with a regular periodicity.

16. The tangible, non-transitory, machine-readable medium of claim 10, wherein the machine-readable instructions, when executed by the one or more processors, cause the one or more processors to perform the operations in response to an addition of the device to the network.

17. An apparatus for automatically tracking a configuration of a device located on a network, comprising:

a memory; and one or more processors configured to execute instructions stored in the memory to:

identify a device located on a network;

generate a hardware configuration classifier for the device, wherein the hardware configuration classifier is generated as a function of a hardware component of the device;

determine that the hardware configuration classifier does not match a previously generated hardware configuration classifier for the device in a data store;

store, in the data store, the hardware configuration classifier in association with a device identifier of the device responsive to determining that the hardware configuration classifier does not match the previously generated hardware configuration classifier; and generate a report configured to indicate that a configuration of the device is a new configuration in the network responsive to determining that the device is not associated with an expected device configuration and that the hardware configuration classifier corresponds to the expected device configuration, wherein the expected device configuration comprises a stock keeping unit (SKU) or a bill of materials (BOM).

18. The apparatus of claim 17, wherein the one or more processors are configured to execute the instructions stored in the memory to:

classify both the hardware configuration classifier and an additional hardware configuration classifier different from the hardware configuration classifier with a metadata tag.

19. The apparatus of claim 17, wherein the one or more processors are configured to execute the instructions stored in the memory to, responsive to determining that the device is not associated with a second device identifier and that the hardware configuration classifier corresponds to the second device identifier:

transmit the second device identifier to the device for storage at the device.

20. The apparatus of claim 17, wherein the one or more processors are configured to execute the instructions stored in the memory to, responsive to determining that the device is not associated with a second device identifier and that the hardware configuration classifier corresponds to the second device identifier:

store, in the data store, the second device identifier in association with the device identifier.

* * * * *